(12) United States Patent
Yaport et al.

(10) Patent No.: US 7,143,179 B2
(45) Date of Patent: Nov. 28, 2006

(54) METHOD AND SYSTEM FOR PARALLEL DATA TRANSMISSION ON DEMAND TO AN UNLIMITED NUMBER OF CLIENTS WITHOUT ACKNOWLEDGMENT AND ON THE BASIS OF CONSTANT DATA AVAILABILITY

(76) Inventors: Yuri Yaport, 2958 Barkley Ave., Santa Clara, CA (US) 95051; Genisim A. Tsilker, 10332 Terry Wy, Cupertino, CA (US) 95014

( * ) Notice: Subject to any disclaimer, the term of this patent is extended or adjusted under 35 U.S.C. 154(b) by 675 days.

(21) Appl. No.: 09/865,904

(22) Filed: May 24, 2001

(65) Prior Publication Data

US 2002/0178221 A1  Nov. 28, 2002

(51) Int. Cl.
G06F 15/16 (2006.01)
(52) U.S. Cl. ............... 709/231; 709/230; 709/232; 709/233; 709/223
(58) Field of Classification Search ............... 709/223, 709/224, 227, 231–233, 219, 230; 725/87, 725/90, 93, 98, 100, 101
See application file for complete search history.

(56) References Cited

U.S. PATENT DOCUMENTS

| | | | | |
|---|---|---|---|---|
| 5,684,956 A | * | 11/1997 | Billings | 709/219 |
| 5,752,160 A | * | 5/1998 | Dunn | 725/93 |
| 5,974,458 A | * | 10/1999 | Abe et al. | 709/224 |
| 6,073,180 A | * | 6/2000 | Onoda et al. | 709/230 |
| 6,101,180 A | | 8/2000 | Donahue et al. | |
| 6,286,143 B1 | * | 9/2001 | Asamizuya et al. | 725/92 |
| 6,356,947 B1 | * | 3/2002 | Lutterschmidt | 709/231 |
| 6,434,610 B1 | * | 8/2002 | Wahl | 709/219 |
| 6,499,060 B1 | * | 12/2002 | Wang et al. | 709/231 |
| 6,502,139 B1 | * | 12/2002 | Birk et al. | 709/233 |
| 6,510,556 B1 | * | 1/2003 | Kusaba et al. | 725/93 |
| 6,606,646 B1 | * | 8/2003 | Feigenbaum | 709/231 |
| 6,658,005 B1 | * | 12/2003 | Seidel et al. | 370/394 |
| 6,701,528 B1 | * | 3/2004 | Arsenault et al. | 725/87 |
| 6,823,394 B1 | * | 11/2004 | Waldvogel et al. | 709/231 |

OTHER PUBLICATIONS

Reliable IP Multicast. Reprint from http://www.isoc.org/inet99/posters/087/.
Cable Video-on-Demand Reprint from http://www.cs.tut.fi/tlt/stuff/vod/VoDOverview/vod.html.

* cited by examiner

Primary Examiner—Ario Etienne
Assistant Examiner—Ramy M Osman

(57) ABSTRACT

A high-availability data distribution system of the invention for parallel data transmission on demand comprises a data transmission server, which constantly transmits multiple streams of information to a router or switch, which provides a support for multicast groups, so that at any time any client can subscribe to a particular multicast group for receiving the data. In such a system, the data is received without individual client-server sessions directly from at least two routers, one of which is located on the server's side, and another on the client's side. The system is applicable for distribution of static content such as web content, data base content, raw data files, etc., as well as of dynamic data content, such as weather forecast, stock-exchange data, etc.

12 Claims, 11 Drawing Sheets

METHOD AND SYSTEM FOR PARALLEL DATA TRANSMISSION ON DEMAND TO AN UNLIMITED NUMBER OF CLIENTS WITHOUT ACKNOWLEDGMENT AND ON THE BASIS OF CONSTANT DATA AVAILABILITY

FIELD OF THE INVENTION

The present invention relates to the field of data transmission, in particular to distributing practically unlimited volumes of data to a practically unlimited number of clients with very high transmission speed. The invention may find use in the Internet technology, distributed data base technology, as well as in telephony, multimedia technology, and similar fields. The invention also relates to a new method for transmitting data practically without limitations with regard to the number of users and the amount of the data to be transmitted.

FIGS. 1 AND 2—BACKGROUND OF THE INVENTION

Development of computers brought to existence computer networks. At the earlier stage of their development such computer networks were used for transmission of relatively small amount of data. As the time passed, certain principles and rules have been elaborated in the field of data transmission. Meanwhile, the computer technology has been developing very quickly along with explosive expansion in the amount of data available for distributing. Along with the growing amount of data, the capacity of data transport lines and devices have grown as well. As a result, the existing methods of data transmission appeared to be limiting for further progress in the data distributing technology. The information revolution that occurs at the present time demands that a very high amount of information be constantly available to a very high number of users.

A good example for illustration of the above statement is a well-known Internet, which is interconnection of computers developed by universities, businesses, and telecommunication companies into a worldwide network. The Internet, as of today, is a publicly accessible digital data transmission network, which is primarily composed of terrestrial communications facilities. Access to this worldwide network is relatively low cost and hence, it has become increasingly popular as the biggest media for transmitting information that continues to grow very rapidly.

For Internet transfer, it is relatively unimportant how long each file transfer takes place as long as it is reasonable. Messages are routed through no fixed paths but rather through various interconnected computers until they reach their destination. Communication between the computers occurs via a protocol. The base protocol for the Internet is an IP (Internet Protocol). The IP is a basis for two major groups of protocols, which are a TCP (Transmission Control Protocol) and a UDP (User Datagram Protocol). During traffic congestion, messages will be held at various internal network computers until the pathways are cleared for new transmissions. Accordingly, Internet transmissions are effective, but cannot be relied upon for delivery time sensitive applications.

Web pages are usually collections of data including text, audio, video, and interlaced computer programs. Each web page is located on a specific electronic site, which is accessed through a device known as a web server, and can be accessed supposedly by anyone via the Internet. Web page browsing allows a person to inspect the contents of a web page on a remove server to glean various information contained therein, including, for instance, product data, company backgrounds, and other such information that can be digitized. The remote server data is accessed by a local browser, and the information is usually displayed as text, graphics, audio, and video.

The web browsing process, therefore, is a two-way data communication between the browsing user, who has a specific electronic address or destination, and the web page, which also has a specific electronic destination. In this mode of operation, as opposed to electronic mail functions, responsiveness of the network is of paramount importance since the user expects a quick response to each digital request. As such, each browsing user establishes a two-way data communication, which ties up an entire segment of bandwidth in the Internet system.

Recent developments in the Internet include telephone, videophone, conferencing, and broadcasting applications. Each of these technologies places a similar real-time demand on the Internet. Today, real-time Internet communication requires a constant two-way exchange of data between the users, and each user must receive the data nearly immediately after its transmission by the other user. However, the original design of the Internet did not anticipate such real-time data transmission requirements. As such, these new applications have serious technical hurdles to overcome in order to become viable.

In the Internet, as well as in any other network, the data transmission speed is reduced when the network is crowded. To maximize accessibility of certain data, broadcasts of radio shows, sporting events, and the like are currently provided via the Internet connections whereby the broadcast is accessible through a specific web page connection. However, as detailed above, each web page connection requires a high throughput two-way connection through the standard Internet architecture. The existing Internet network would be quickly saturated with users if the entire set of potential broadcasters across the world began to provide broadcast services via such web page connections. Such broadcast methods through the Internet thereby prove to be ineffective given the two-way data throughput needed to access such web pages with real-time data.

Attempts have been made to overcome the above problem by providing a high bandwidth broadcast system having localized multicast access to broadcast. Thus, U.S. Pat. No. 6,101,180 issued in August 2000 to P. Donahue, et al. discloses a method of multicasting digital data to a user accessing an Internet connection. The method includes placing digital data that is to be multicast in IP protocol to generate IP digital data. The IP digital data is transmitted from a transmission site to a remote Internet point of presence through a dedicated transmission channel substantially separate from the Internet backbone. The dedicated transmission channel may be, for example, a satellite channel. At the remote Internet point of presence, the IP digital data is multicast for delivery to at least one receiving Internet user's apparatus connected to but distal from the remote Internet point of presence.

However, the above method does not solve the problems associated with limitations of the existing Internet, but rather creates other communication channels for buffering the Internet with additional communication channels, such as satellite channels. In other words, the proposed system expands the Internet and does not offer any new approaches for use of the existing Internet on a basis of a new principle.

There is an enormous demand for the delivery of large amounts of content to a large number of listeners. The broadcast channels of today, such as radio and TV, can only deliver a small number of channels to a large number of listeners. Their delivery mechanism is well known to clients. The broadcaster transmits programs and the listener must "tune in" at the proper time and channel to receive the desired show.

"On Demand" systems have been attempted by the cable TV industry (see the article in the Internet at http://www.cs.tut.fi/tlt/stuff/vod/VoDOverview/vod.html#intro. Such systems attempt to transport the program or show from a central repository (server) to the user (client) in response to his/her request. To initiate the request, the user selects from a list of candidate programs and requests that the system deliver the selected program.

The foregoing "on demand" model of content delivery places two significant requirements on the delivery system. First, there should be a direct connection between each server and each listener (client). The phone system is an example of such a point-to-point interconnection system. Another example of such an interconnection system is the Internet, which is also largely based on the terrestrial telecommunications networks. Second, the server must be capable of delivering all the programs to the requesting clients at the time at which the client demands the program.

For better understanding the mechanism of the existing data distribution system inside a network such as the Internet, it would be advantageous to define some terms and to illustrate such mechanism by the diagrams shown in FIGS. 1 and 2, wherein FIG. 1 is a very schematic representation of an existing system for unicast connection, and FIG. 2 is a similar diagram relating to multicast connection.

In FIG. 1, reference numerals 20-1, 20-2, 20-3, 20-N-1, 20-N designate web servers, which are connected to network devices, such as 22-1, 22-2, 22-3, 22-4, and 22-5 known as a routers (only five of them are shown only as an example). A router is a device that handles traffic between the networks. In the diagram shown in FIG. 1, the router 22-1 connects the website 30-1 formed by the web servers 20-1, 20-2, 20-3, and the router 22-2 connects the website 30-2 formed by web servers 20-N-1, 20-N with the Internet 24. The meaning of the Internet has been explained earlier. Reference numerals 26-1, 26-2, 26-3, 26-4, 26-5 designate numerous clients who are subscribers of the illustrated website (only five clients are shown as an example).

Operation of the website 30-1 of FIG. 1 in a unicast mode using the aforementioned TCP/IP protocol proceeds as follows.

When a request occurs from a specific client, e.g., from the group 26-1, a connection is established between the client and the web site by means of the routers 22-1, 22-3 via an optimal path 28-1, 28-2, 28-3 so that a session is established. The path 28-1, 28-2, 28-3 is determined on the basis of a routing algorithm, e.g., such as BGP-4 (Border Gateway Protocol, Version 4). In the illustrated case, the router 22-1 is the router that advertised the path to the web site 30-1 which contains various network appliances including web servers 20-1, 20-2, 20-3. In accordance with the protocol the connection is confirmed by acknowledgement, and the data is transmitted to the client 26-1 via the established connection. The entire information is transmitted by portions, known as protocol data units. Reception of the information by the client must be confirmed by a separate acknowledgment for each separate protocol data unit. If for some reason the acknowledgement is not received, the server will retransmit the data within two minutes, and in case of a failure the connection will be dropped. Such a procedure occurs simultaneously with a great number of clients, so that one and the same information, e.g., a web page of Yahoo.com is requested by a great number of clients simultaneously. However, each server of the group of servers 20-1, 20-2, 20-3 has some limitations on amount of sessions that it can support, and a common situation is that there are more users than available connections. This results in a long waiting time or a non-availability of the web site. Thus, it can be concluded that in the existing technology, a plurality of individual sessions occurs between individual clients and the server(s) with constant confirmation of the data reception, whereby the network has constant overhead and unnecessary traffic. But what is most important that the amount of sessions is limited.

A known multicast data distribution system shown in FIG. 2 is applicable for distributing information which does not need confirmation and in which an accidental loss of some data is not critical. An example of such application is distribution of multimedia contents such as movies, news, music, etc. Reference numeral 32 designates the web server. Reference numeral 44 is the Internet, and 42-1, 42-2, 42-3 are clients of group 42; 40-1, 40-2 are clients of group 40, etc. The Internet is based on a plurality of routers 36-1, 36-2, 36-3, that may establish an optimal path for transmitting the requested information on the basis of a special protocol known as the Internet Group Multicast Protocol (IGMP). The multimedia contents are transmitted from the web server 32 to the clients of the groups 42 and 40 via the router 36-1 through a communication line 34-1 and further via an optimal path through other routers and the communications lines. In the case illustrated in FIG. 2 this optimal path consists of routers 36-2 and 36-3 and communication lines 34-2, 34-3, 34-4, 34-5, and 34-6.

The information distribution system of FIG. 2 differs from the one shown in FIG. 1 in that the data flow from the server 32 is transmitted in real time to the router 36-1, which advertises a multicast group (although only one group is shown in FIG. 2 by the communication line 34-1, several such groups can be used simultaneously), and when a specific client, e.g., the client 40-1, subscribes to a specific multicast group, the routers 36-1, 36-3 are forming an optimal path for transmitting the subscribed information to the client 40-1. In this scenario, no sessions are established between the client and the server, since the entire data entity is constantly available for subscription, and any data constantly available on the router 36-1 can be obtained simultaneously by a virtually unlimited number of clients without any confirmations. As has been mentioned above, some data can be lost, as in such a system the reliability of transmission is not an issue. Therefore the existing multicast data distribution systems are not applicable for transmitting information contents, for which completeness of the transmitted data and reliability of transmission are critical.

Known in the art are also systems which may be called "hybrid-type" multicast data distribution systems. Such systems are a combination of a unicast system of FIG. 1 with a multicast system of FIG. 2. An example of a hybrid-type multicast data distribution system is described in an article available in the Internet at http://www.isoc.org/inet99/posters/087/. This system combines the multicast data distribution with confirmation features such an acknowledgement.

However, the described system is yet not sufficiently reliable since reliability is supported only due to retransmission of the data. On top of that, such system, if implemented, would be very expensive as it requires many complex routers. Probably, for this reason the hybrid systems have not yet found commercial application.

Another disadvantage, which is common for all known data distribution systems, is that all data is transmitted sequentially. In other words, even if the data is divided into separate groups (packets), all the groups are transmitted one after another until the entire data entity is received. In the case of a large amount of requested data, such as, e.g., several gigabytes, the transmission takes a substantial amount of time. In other words, the scheme of data transmission is linear and the time is proportional to the volume.

OBJECTS OF THE INVENTION

It is an object of the present invention to provide a high-availability data distribution system for parallel data transmission on demand which allows data providers to simultaneously service practically an unlimited number of clients at any time, does not require individual client-server sessions, reliably operates without acknowledgements, provides high rate of transmission of massive data. Another object is to provide a method for transmitting data practically without limitations with regard to the number of users and the amount of the transmitted data.

SUMMARY OF THE INVENTION

A high-availability data distribution system of the invention for parallel data transmission on demand comprises a data transmission server, which constantly transmits multiple streams of information to a router or switch, which provides a support for multicast groups, so that at any time any client can subscribe to a particular multicast group for receiving the data. In such a system, the data is received without individual client-server sessions directly from at least two routers, one of which is located on the server's side, and another on the client's side. The system is applicable for distribution of static contents such as web contents, data base contents, raw data files, etc., as well as of dynamic data contents, such as weather forecast, stock-exchange data, etc.

DETAILED DESCRIPTION OF THE INVENTION

The system of the invention will now be described in detail with reference to FIG. 3, which is a schematic representation of a system of the present invention for parallel data transmission on demand to multiple recipients without acknowledgment.

Figure 2:
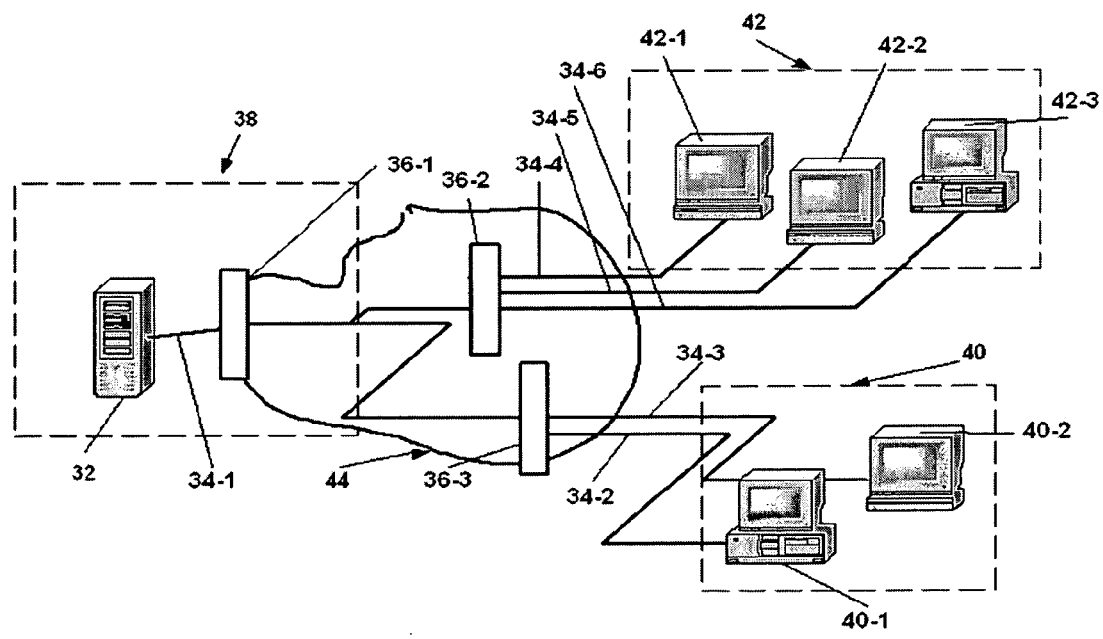
FIG. 2 is a schematic representation of an existing data distribution system for multicast connection.

As shown in this drawing, the system of the invention, as an existing system of FIG. 2, consists of a server 100, a multicast data transmission means such as a router 102, groups of clients 104-1, 104-2, 104-3 . . . 104-n with respective routers 106-1, 106-2, 106-3, . . . 106-n and the Internet 107 located between the routers of the groups of clients 104-1, 104-1, 104-3 . . . 104-n and the router 102. For the simplicity of the drawing, only four routers associated with the groups of clients are shown in FIG. 3, though in reality the number of such routers will correspond to the number of groups of clients.

In accordance with a conventional practice, in order to be a subscriber of the system of the invention, the clients 104-1, 104-1, 104-3 . . . 104-n should preliminary download the program that allows them to receive and process the information available in the system of the invention.

Till this point the structure of the system described above is similar to conventional systems shown in FIG. 2. Distinguishing features of the system of the invention, which supports the principle of parallel data transmission on demand to multiple recipients without acknowledgment, are the architecture of the server 100 and the method of multicast parallel data transmission without client-server sessions and acknowledgement.

Figure 3:
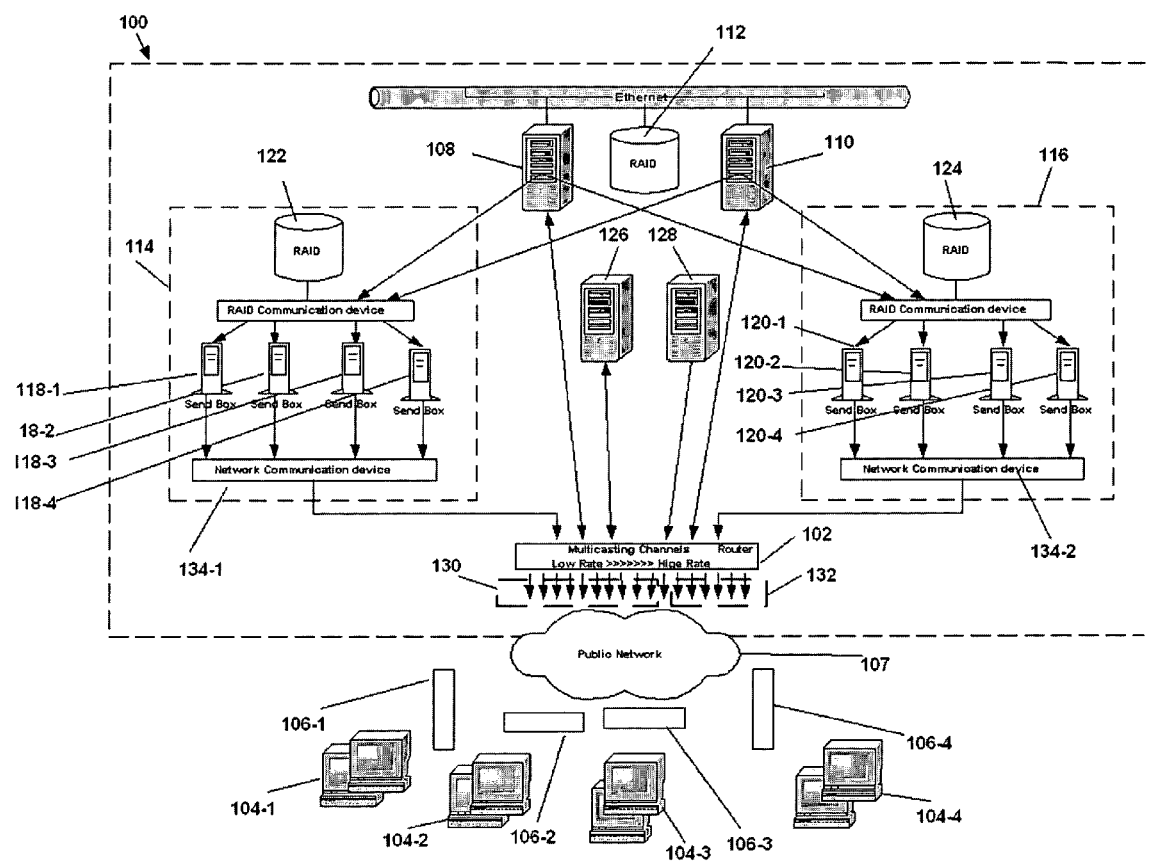
FIGS. 3, 4, and 5 are schematic representations of a system of the present invention for parallel data transmission on demand to multiple recipients without acknowledgment.

As shown in FIG. 3, the server 100 contains a primary data processing manager machine 108 and a secondary data processing manager machine 110 for maintaining high availability of the system, since in case of failure of the primary data processing manager machine 108 its functions will be automatically accepted and performed by the secondary data processing manager machine 110. The machines 108 and 110 are connected to a high-availability data storage device, such as RAID (Redundant Arrays of Inexpensive Disks) 112. The RAID 112 stores the entire information available for the groups of clients 104-1, 104-1, 104-3 . . . 104-n.

The entire information available to the clients consists of individual data items known as files. It is understood that many such files are contained in the system. In order to provide constant availability of the entire information stored in RAID 112 for any client of any group, each file is divided into data segments which will be described later. These data segments are distributed between data transmission units 114 and 116 (FIG. 3), only two of which are shown as an example. Each such data transmission unit, in turn, contains a plurality of send boxes. In the embodiment shown in FIG. 3, the data transmission unit 114 contains send boxes 118-1, 118-2, 118-3, and 118-4, whereas the data transmission unit 116 contains send boxes 120-1, 120-2, 120-3, and 120-4. Four send boxes are shown in each data transmission unit only as an example. The greater the amount of the data transmission units and send boxes in them, the higher speed of data transmission can be achieved.

The aforementioned data segments are stored in local data storage devices such as a RAID 122 in data transmission unit 114 and a RAID 124 in data transmission unit 116. If the data stored in the main RAID 112 is changed, the information on RAIDs 122 and 124 is updated in real time.

Reference numeral 126 designates a monitoring unit, which constantly checks the condition of server-client connections via the routers. Depending on the quality of the connection channels, the monitoring unit 126 controls the quality of data transmission by assigning an appropriate data coding algorithm via the activated data processing manager 108 or 110 to the send boxes of the data transmission units 114 and 116.

If necessary, the system may contain a real time data generator 128, which generates dynamic data such as weather forecast, etc.

All send boxes 118-1, 118-2, 118-3, 118-4, 120-1, 120-2, 120-3, 120-4, as well as the real time data generator 128 constantly transmit all available data to the router 102. The router 102 is configured in such a way that its channel groups 130 and 132 cover all possible data transmission speeds which may depends on characteristics of receivers on the clients' side. In order to ensure equal data transmission capacity through low-speed and high-speed channels, the number of low-speed channel groups 130 for transmission of the same information is greater than the number of high speed channel groups 132. Each channel of the channel group 130 and 132 is capable of transmitting information to clients associated with one multicast group.

The aforementioned data segments are relatively large data items, which cannot be transmitted at one-time transmission. Therefore send boxes 118-1, 118-2, . . . 120-4 transform the data segments into smaller protocol data units (PDUs) which are further delivered to the router 102. This is explained with reference to FIG. 4.

Figure 4:
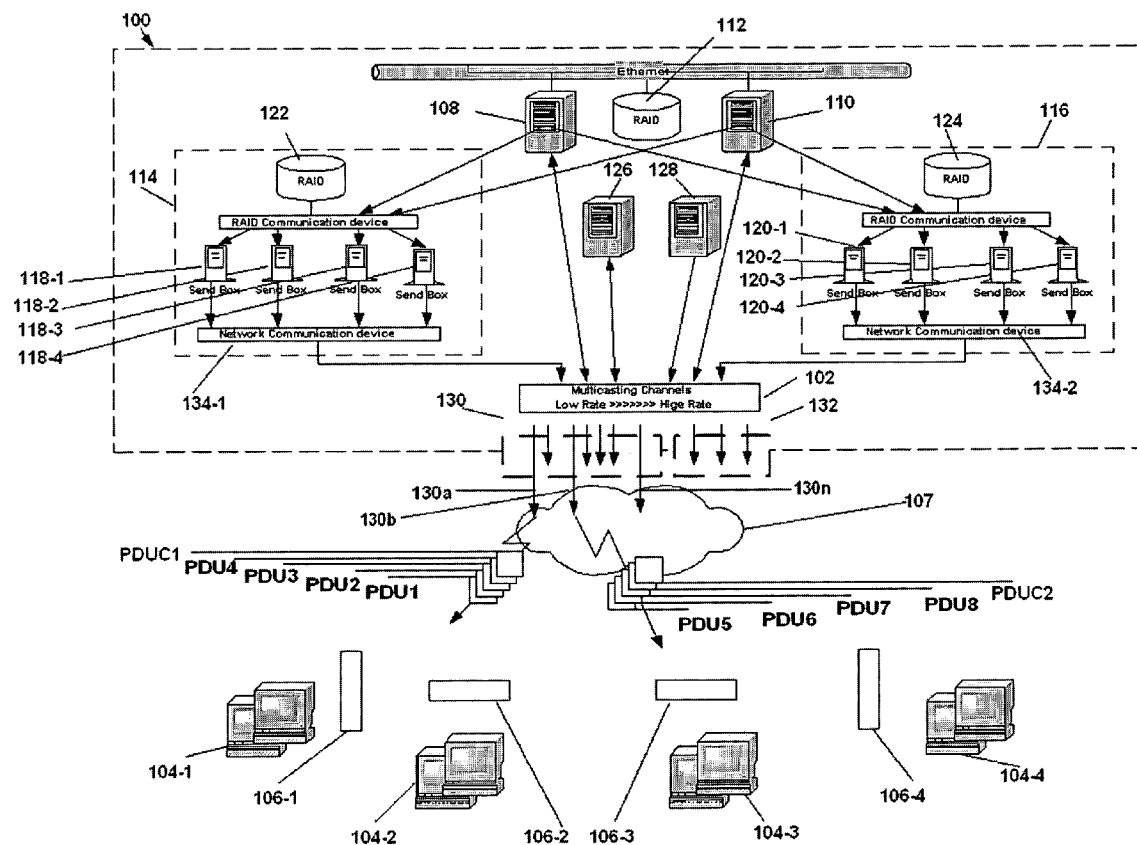

FIG. 4 illustrates distribution of data over the channels of one of the channel groups, e.g., 130. Reference numerals 130a, 130b, . . . 130n designate individual channels. As has been mentioned above, the entire information available to the clients is divided into segments, which, in turn, are divided into information data units. These information data units are processed for determining checking information, which may be later used for restoring the lost data. The checking information is collected into separate control data units. For identification purposes, each data segment, information data unit, and control data unit are marked with an individual identification number. The identification numbers in combination with other data, which will be shown below in the description of operation, form a header. A combination of the header with the information data unit forms an information protocol data unit. On the other hand, a combination of the header with a control data unit forms a control protocol data unit.

Figure 5:
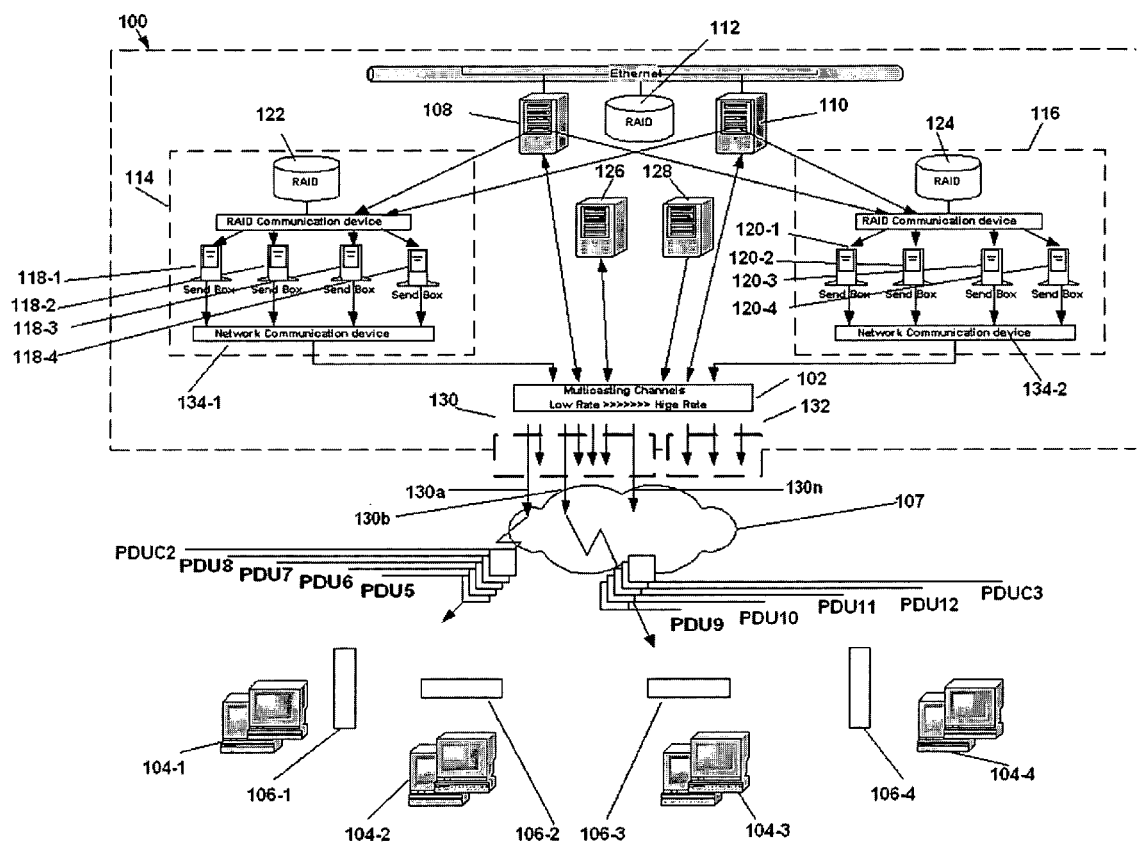

More specifically, protocol data units consist of informational protocol data units PDU1, PDU2, PDU3, PDU4, and a control protocol data units, such as a PDUC1 (i.e., control data unit for this group) which altogether correspond to a data segment DS1. The numbers of information protocol data units of each protocol data unit and the number of the control protocol data unit corresponding to a particular channel are shifted by one with respect to the next channel. In other words, while the channel 130a contains informational protocol data units PDU1, PDU2, PDU3, PDU4, and control protocol data unit PDUC1, the channel 130b contains informational protocol data units PDU5, PDU6, PDU7, PDU8, and control protocol data unit PDUC2, etc. Thus, each channel, in the illustrated case 130 and 132, receives from the send boxes of the data transmission units 114 and 116 the corresponding data segment with informational protocol data units and the control protocol data unit shifted by one. This is shown in FIG. 5, which is the same as FIG. 4 but shows the data unit groups in a condition shifted by one step.

Thus, the entire information stored in the RAID 112 is practically instantly available for transmission to any number of clients on the router 102 in the form of PDUs. The PDUs are transmitted from send box groups of the data transmission units 114 and 116 to the router 102 via respective network communication devices 134-1 and 134-2.

The aforementioned control data units PDUC1, PDUC2 . . . are intended for improving reliability of data transmission. In other words, if any informational PDU such as PDUC1, PDUC2 . . . is lost during the transmission, the control protocol data units of all data segments will allow to restore the missing data. The checking and data restoration processes will be explained later in connection with operation of the system. The size of the combined PDU groups is selected depending on requirements of reliability. The smaller the number of informational PDUs in the group, the higher is reliability of lost data restoration.

Figure 1:
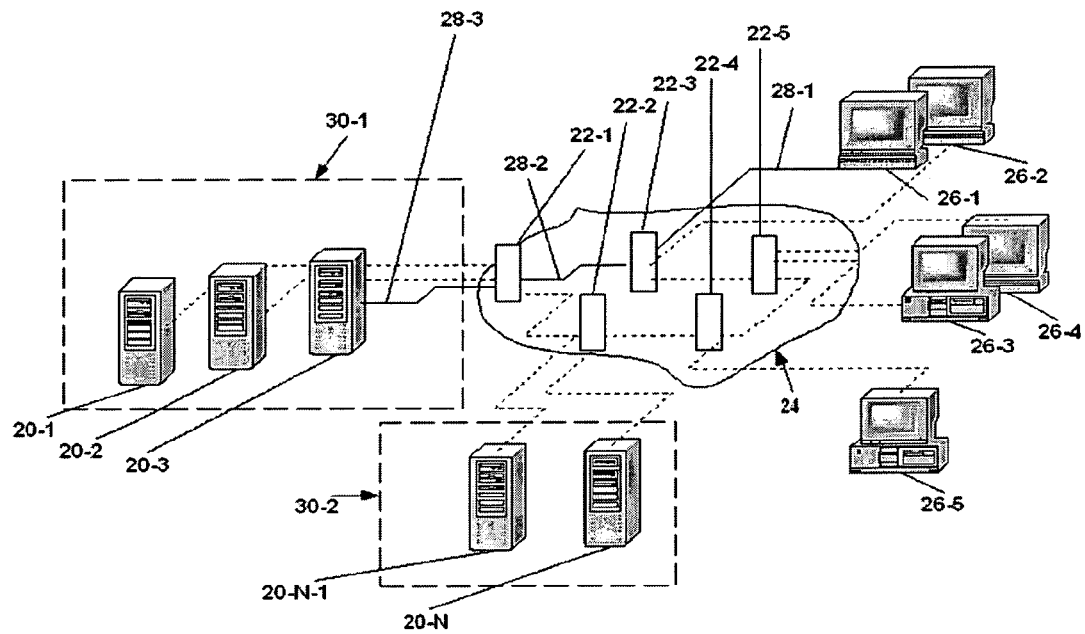
FIG. 1 is a schematic representation of an existing data distribution system for unicast connection.

The part of the system that consists of the Internet 107 and the groups 104-1, 104-2, . . . 104-n of clients with associated routers 106-1 and 106-2 is the same as in conventional systems shown in FIGS. 1 and 2.

FIGS. 6–12—Operation of the System of the Invention

Figure 6:
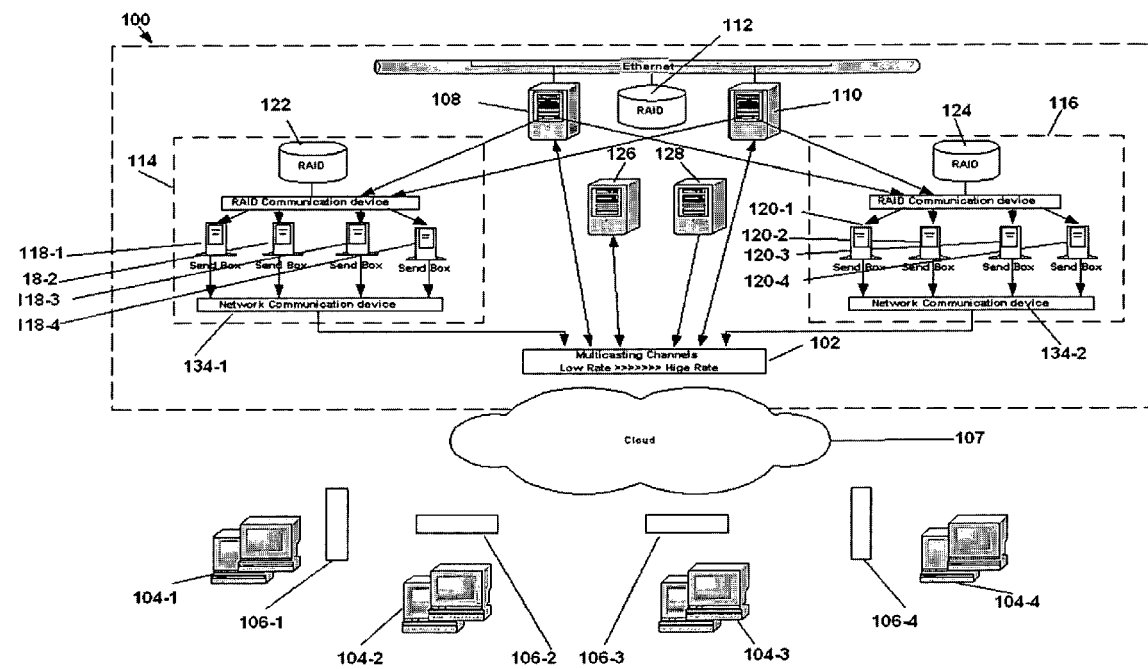
FIGS. 6 to 9 illustrate sequential steps in operation of a data distribution system of the present invention for parallel data transmission and receiving on demand.

Operation of the system of the invention will be described with reference to FIGS. 6–9 which illustrate sequential steps of data transmission in real time from the server to the customer in a multicast mode without individual sessions, without acknowledgements, and with high degree of reliability. FIG. 6 illustrates a stand-by condition when no requests are submitted from the clients to the system. It can be seen from FIG. 4, that the entire information available to the clients 104-1, 104-2, . . . 104-n, is constantly transmitted from the send boxes 118-1, 118-2, . . . 120-3, 120-4 of the data transmission units 114 and 116 to the router 102. It has been mentioned above that although only two data transmission units are shown, their number is not limited.

Figure 7:
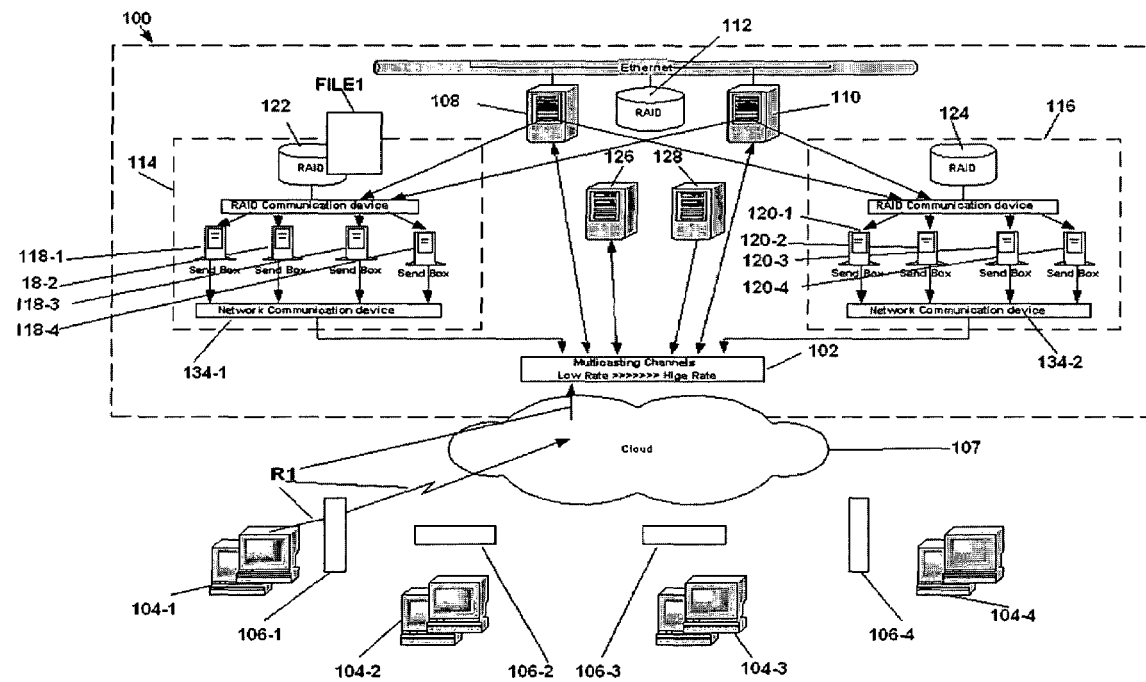
Figure 8:
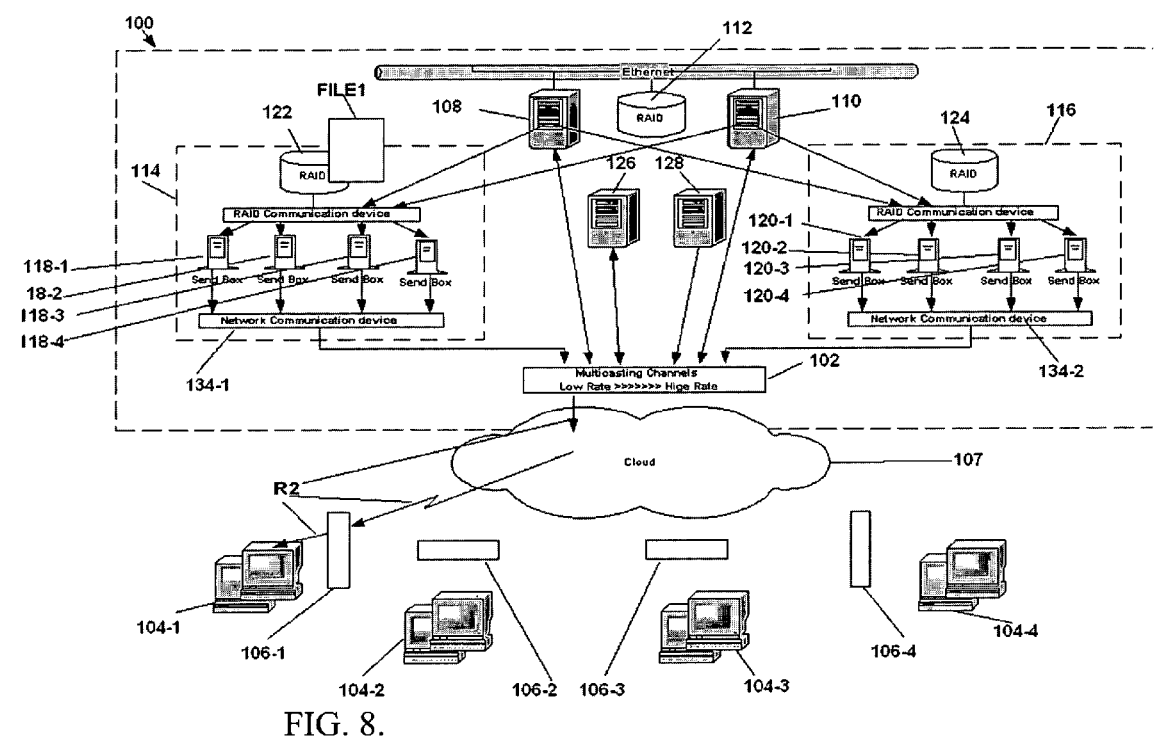

FIG. 7 shows a condition in which a request R1 for a specific information came from the client 104-1. This request R1 arrives at the local router 106-1 associated with this specific client. As a result of the request, the client 104-1 is joined to one of multicast groups associated with the channels of the router 102. In a conventional manner, i.e., via the Internet 107, the request arrives to the router 102 where the requested information is always available. This condition is illustrated in FIG. 8, which shows that the request R1 reached the router 102.

Since the entire information is always transmitted from the server 100 to the router 102 in a manner described earlier, i.e., via send boxes of the data transmission units, the request will arrive randomly to one of PDUs (FIG. 4).

It has been mentioned that each PDU normally consists of a header and data. The structure of the header of a PDU used in the principle of the invention is shown below. It can be seen that the header consists of the following fields:

DATA ID of the file
DATA LAST UPDATE TIME
DATA TOTAL SIZE
DATA SEGMENT NUMBER
DATA SEGMENT SIZE
DATA CODING TYPE
DATA UNIT NUMBER
DATA UNIT TYPE
FLAG "LAST DATA UNIT"
FLAG "LAST DATA SEGMENT"

HEADER CHECK SUM

PDU DATA CHECK SUM

Figure 9:
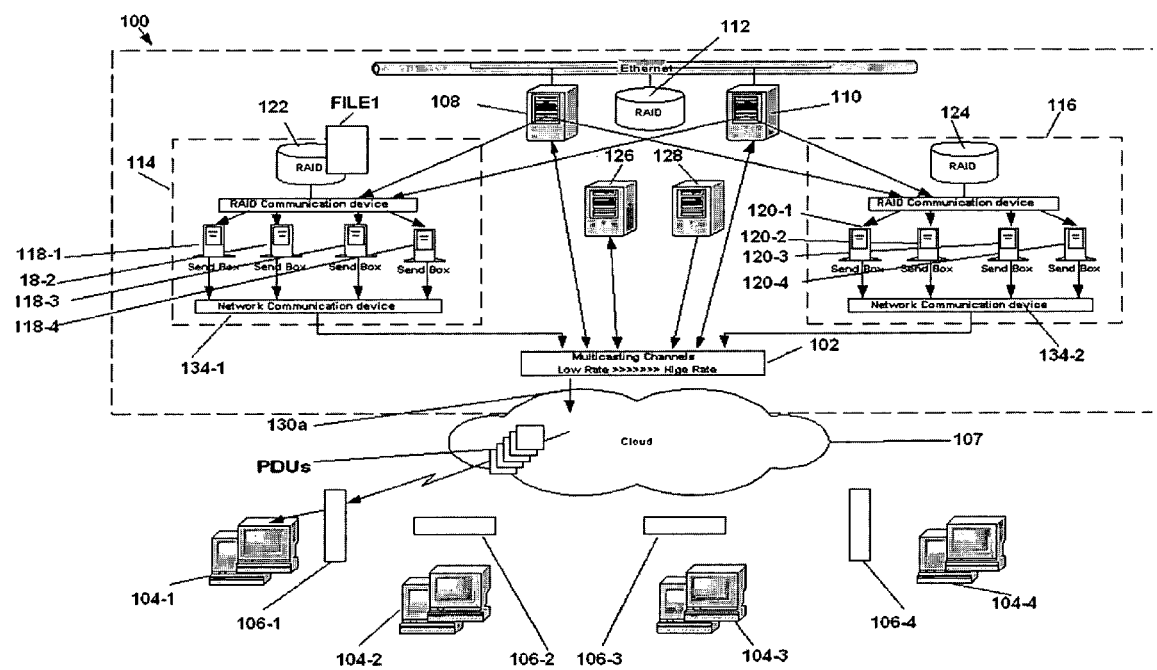

In response to the request R1, the client 104-1 receives the randomly selected initial PDU. The information contained in the header allows the client to decide, e.g., on the basis of the DATA ID and DATA SEGMENT NUMBER, whether the information contained in the current PDU corresponds to the request or not. If the information corresponds to the request, the requested data is transmitted to the client 104-1 via the established communication channel, which in the illustrated case is the channel 130*a*. This is shown in FIG. 9.

If the randomly received information does not correspond to the request R1 but the DATA ID requested by the client is close to the current DATA ID of FILE 1, which contains the requested information (FIGS. 8 and 9), the client 104-1 continues to stay on the current channel 130*a* and waits until the transmission of the requested protocol data unit of FILE1 begins. If the requested DATA ID is far from the current DATA ID which is available for current communication channel, the client 104-1 will close this channel 130*a* and will join the multicast group which is associated with the next channel, which may be 130*b* or another channel that has a current DATA ID closest to the requested one. This process of joining, checking, and rejecting is continued until the client 104-1 finds the channel which transmits the sought data or data having DATA ID close to the requested one.

The transmission of the data is continued until the client receives the entire requested data. It is understood that process is accompanied by analysis of the headers of received PDUs.

For simplicity, we have described transmission of the requested data via a single channel, i.e., the channel 130*a*. If the size of data in the file is significant, the client may open several channels for parallel receiving of the requested data. This is possible due to the aforementioned division of the file into separate segments with overlapped or shifted information and subsequent assembling of the divided files on client's side.

DATA ID is a unique ID of the file transmitted to the current multicast group.

For data which is dynamically updated, it is important to analyze the field DATA LAST UPDATE TIME. This field is required as the data being transmitted can be dynamically updated, even during transmission time. The data is considered safely received if all PDUs have the same DATA LAST UPDATE TIME.

The field DATA TOTAL SIZE is used by the client for evaluating the size of the requested data and the transmission time.

The field DATA SEGMENT NUMBER is used for locating the segment in the file and for ordering the requested segment.

The field DATA SEGMENT SIZE is needed for the same purpose as the DATA TOTAL SIZE.

The field DATA CODING TYPE determines the algorithm of coding data used by the server 100. This is necessary for decoding the received data and for subsequent search of missing data, if such necessity occurs.

The field DATA UNIT NUMBER is used for locating the PDU in the segment and for ordering this PDU.

The field DATA UNIT TYPE determines whether the requested PDU is an informative or control PDU.

The field FLAG "LAST DATA UNIT" is a marker for detecting the end of the current data segment.

The field FLAG "LAST DATA SEGMENT" is a marker for detecting the end of the requested data.

The field HEADER CHECK SUM is control information for checking the completeness of the transmitted PDUs relating to the header.

The field PDU DATA CHECK SUM is used for controlling completeness of information contained in DATA PDUs.

After the entire FILE1 is transmitted, the client 104-1 rejects from the multicast group, and connection between the local router 106-1 of the client 104-1 and the router 102 of the server is interrupted.

The description given above related to a single client 104-1. It is understood that the number of clients which are subscribers of the system of the invention and which can simultaneously receive the information may be practically unlimited. This is because the entire information is always available on the router 102 and in order to receive this information the clients need only to establish connection with the router 102 without any individual sessions. The efficiency and speed of transmission of the information are improved due to the fact that, in contrast to the conventional multicast systems where the entire file is transmitted via a single multicast channel (FIG. 2), in the system of the invention the file is divided into data segments which are transmitted in a parallel mode, i.e., simultaneously, with shifting of the segments via several groups of channels with different speed of transmission.

Let us consider now the case when at least one PDU contained in corresponding segment is lost during transmission. Since the system operates continuously, i.e., in a closed-loop manner without acknowledgement, the client may stay on the line until the lost PDU is automatically received in the repeated cycle of the data retrieval and transmission.

The process of the lost PDU recovery can be accelerated by using other parallel data transmission channels, along which the same data is transmitted with shifting. With several simultaneously working channels, the speed and reliability of transmission is high due to the described mechanism of lost data recovery.

Figure 10A:
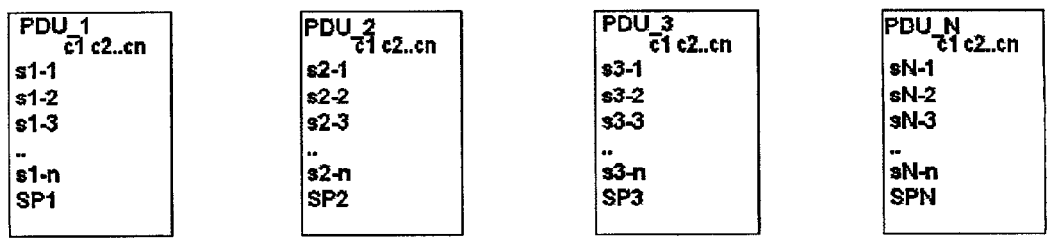
FIG. 10A illustrate a set of data prior to coding.

An additional measure for improving reliability of data transmission is implementation of data encoding methods. One example of such methods is shown in FIG. 10A with presentation of groups of PDUs in the form of matrices. The entire string of data transmitted from the data transmitted units 114 and 116 is chopped into lines of equal lengths, whereby the lines are accumulated and thus form a rectangular matrix having a known number of lines. As a result, as shown in FIG. 10A, the PDU1 can be presented in the form of a rectangular matrix having lines S1-1, S1-2, S1-3, S1-4 and a known number of columns C1, C2, C3, . . . Cn. Similarly, the PDU2 can be presented in the form of a matrix having lines S2-1, S2-2, S2-3, S2-4 and the same number of the columns C1, C2, C3, . . . Cn as in the matrix of PDU1.

In the illustrated example, the coding of the data for parity check is based on a parity control bit. The parity check lines are last lines in the matrices, i.e., SP1, SP2, SP3, and SP4.

Figure 10B:
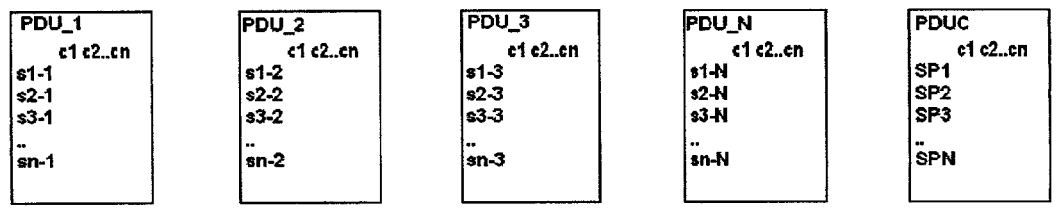
FIG. 10B illustrates an example of data coding used for improving reliability of parallel data transmission and for restoring of lost data.

The data contained in the matrices shown in FIG. 10A are reorganized in manner shown in FIG. 10B. More specifically, all lines to which the same numbers are assigned, i.e., S1-1, S2-1, S3-1, S4-1, are grouped into a new separate matrix. In the same manner, all parity check lines are grouped into a separate PDUC matrix, which is the extreme right in the matrix group of FIG. 10B.

After the client has received all data, except for those which are lost, the data is transmitted from the reorganized matrices shown in FIG. 10B so that the lines from all the reorganized matrices of FIG. 10B are regrouped back into their original structure of FIG. 10A, whereby the initial data are restored. If the one of the PDUs is lost entirely, the data can be restored with the use of all informative PDUs in conjunction with the control protocol data unit PDUC.

Figure 11:
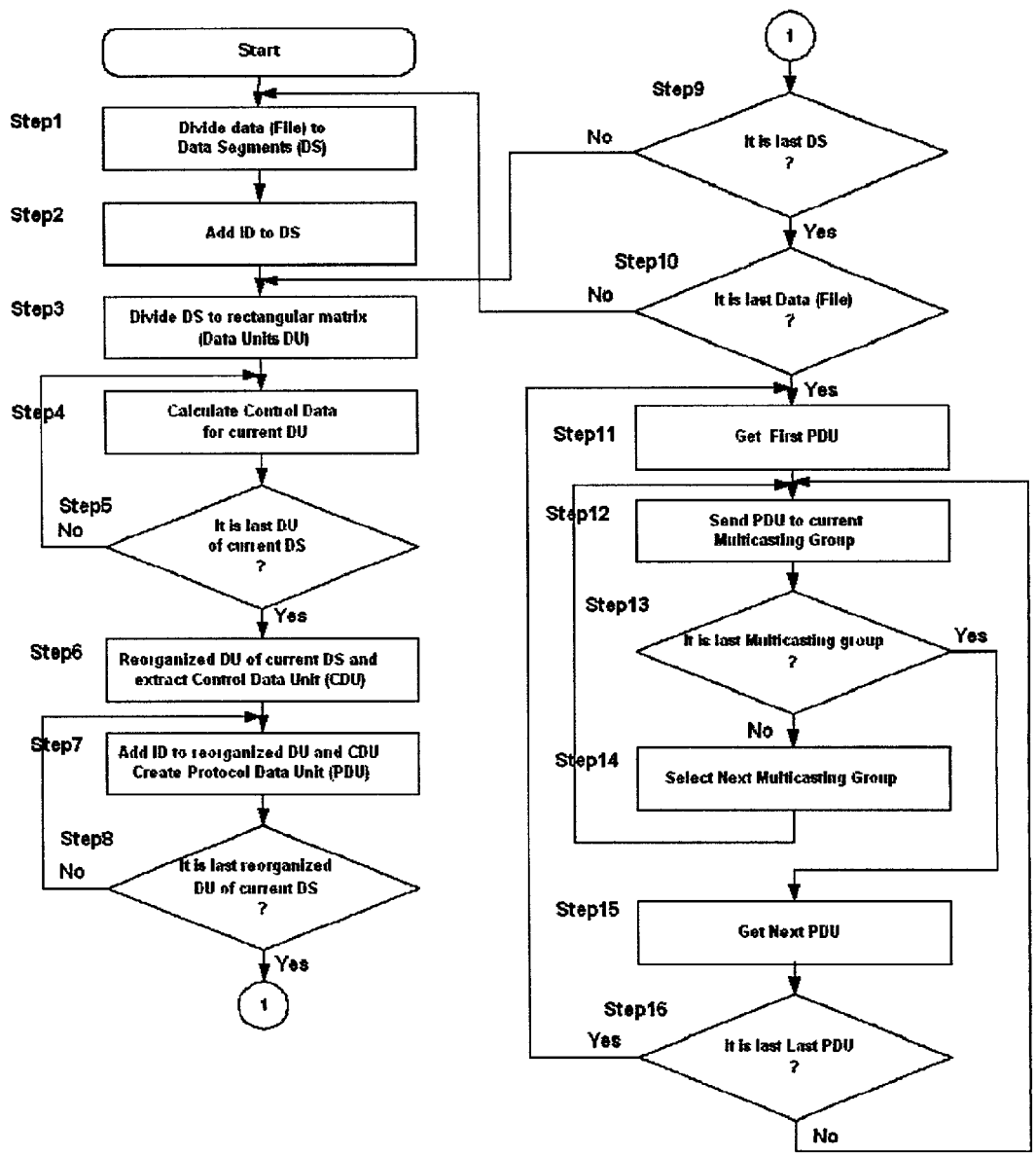
FIG. 11 is a flowchart of a data transmission process in accordance of the invention.
Figure 12:
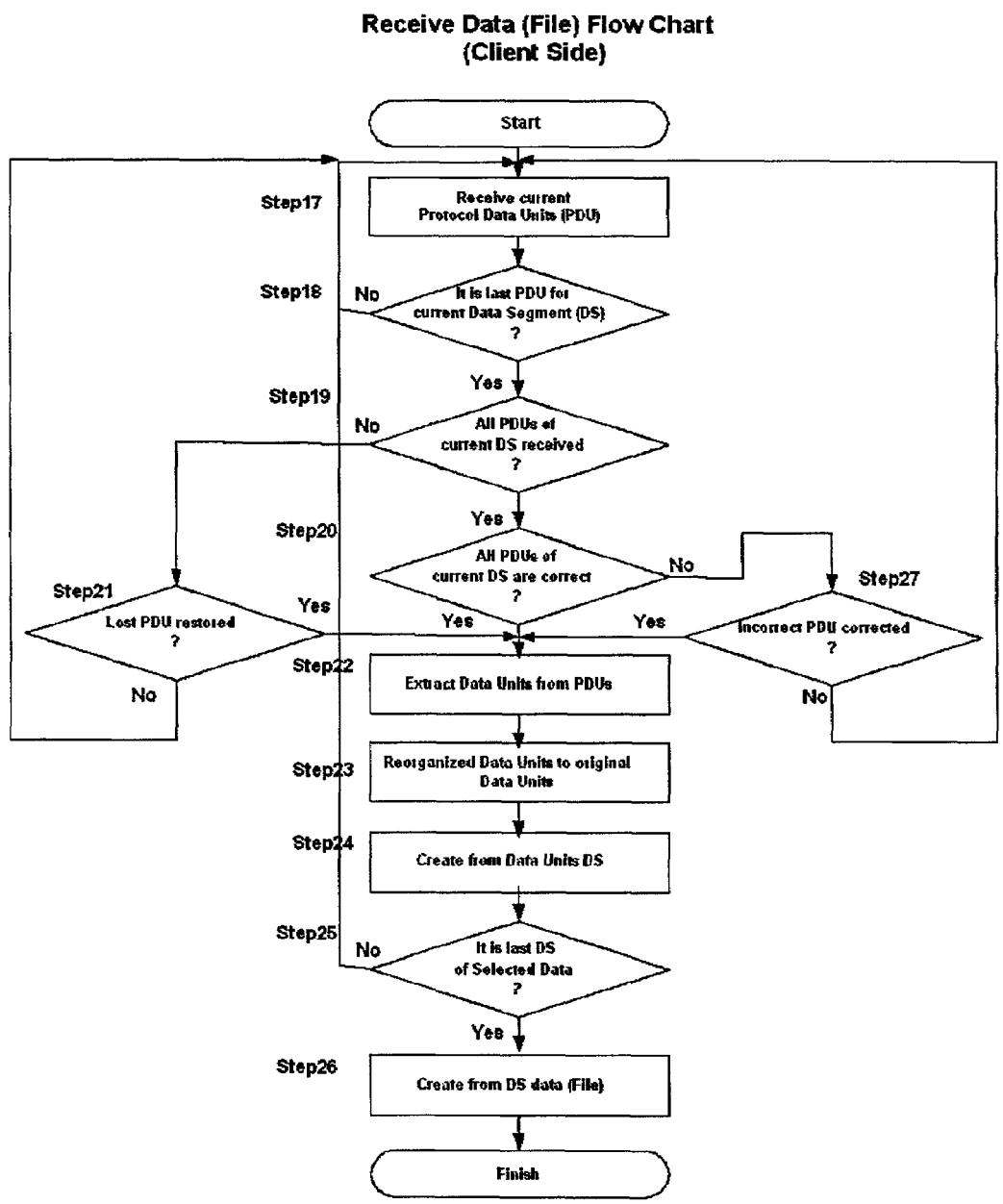
FIG. 12 is a flowchart of a data receiving process in accordance with the invention.

FIGS. 11 and 12 illustrate the flow charts of the entire data transmission process in accordance with the sequence of operation described above. FIG. 11 is a flowchart of a data transmission process (Steps 1 to 16), and FIG. 12 is a flowchart of a data receiving process (Steps 17 to 27).

Thus, it has been shown that the invention provides a high-availability data distribution system for parallel data transmission on demand which allows serving practically an unlimited number of simultaneous clients at any time, does not require individual client-server sessions, reliably operates without acknowledgements, provides high rate of transmission of massive data. The invention also provides a method for transmitting data practically without limitations with regard to the number of users and the amount of the transmitted data.

Although the invention has been shown and described with reference to specific embodiments, it is understood that these embodiments should not be construed as limiting the invention and that any changes and modifications are possible provided they do not depart from the scope of the patent claims. For example, the wide area network is not necessary is the Internet and may be any other wide area network. The number of subscribers may exceed millions. Although only data transmission units are shown, the number of data transmission units also can be increased. The system of the invention is applicable not only to computer users but also to users of cellular phones. The system of the invention can be used for synchronous transmission of data in distributed data bases, i.e., automatically without requests. The number of send boxes within the data transmission units may exceed four and depends on the speed of transmission.

The system of the invention can be used for rapid press release of information to be printed all over the world. Another field of application is immediate notification about catastrophes and dangerous situations. One client may have capability of receiving the selected information in parallel mode but via several different speed channels simultaneously.

We claim:

1. A method of data transmission on demand to a plurality of clients without acknowledgment, the method comprising:
    dividing information content stored on a server into information data units, each of said information data units comprising a rectangular matrix of lines and columns;
    assigning numbers to said lines and columns;
    reorganizing said information data units by collecting lines to which the same numbers are assigned into reorganized data units;
    forming a plurality of data portions from the reorganized data units and control data units having check information for corresponding information data units;
    constantly transmitting the plurality of data portions to at least one router on a server side for constant availability of the information content to the plurality of clients;
    upon receiving a content request at one of a plurality of channels at the at least one router from one of the plurality of clients, sending a random one of the plurality of data portions to the one of the plurality of clients, the random portion comprising data indicating whether the random portion is part of the requested content; and
    if the random portion is part of the requested content, sending the rest of the requested content to the one of the plurality of clients via the one of the plurality of channels.

2. The method of claim 1, wherein the plurality of data portions are transmitted simultaneously via parallel channels.

3. The method of claim 2, wherein said parallel channels are combined into groups of channels having the same data transmission speed in each group.

4. The method of claim 3, wherein the plurality of data portions is transmitted simultaneously via all said groups.

5. The method of claim 1, wherein forming the plurality of data portions comprises:
    determining check information for each one of said information data units using parity check data in corresponding lines and columns;
    collecting said check information from all said information data units to form control data units;
    assigning identification information to each of said reorganized data units and said control data units; and
    forming information protocol data units and control protocol data units by combining said identification information with respective reorganized data units and said control data units.

6. The method of claim 5, wherein the rest of the requested content is transmitted to the one of the plurality of clients via one channel having the speed of transmission corresponding to that at the one of the plurality of clients.

7. The method of claim 5, further comprising the one of the plurality of clients checking completeness of the transmitted content by:
    collecting said information protocol data units and said control protocol data units relating to said portion of said requested content selected by the one of the plurality of clients;
    extracting said reorganized information data units from said information protocol data units;
    extracting said control data units from said control protocol data units;
    checking completeness of said information data units relating to each said data segment in said portion of said requested content selected by the one of the plurality of clients; and
    converting said reorganized data units to the form preceding the reorganizing.

8. The method of claim 7, further comprising:
    assembling each of said data segments contained in said portion of said requested content selected by the one of the plurality of clients from said information data units related to said data segments, if said information data units are present; and
    assembling each of said data segments contained in said portion of said requested content selected by the one of the plurality of clients from said information data units related to said data segments.

9. The method of claim 8, further comprising of:
    interrupting the receiving, if all portions of the requested content are received.

10. The method of claim 7, further comprising:
    restoring said data lost during the receiving by means of said control data unit and those of said information data units which have been received by the one of the plurality of clients and relates to the same data segment.

11. A system for data transmission on demand to a plurality of clients without acknowledgment, the system comprising:

a data storage device to store information content in a plurality of files;

at least one server to divide the information content into information data units, each of said information data units comprising a rectangular matrix of lines and columns, to assign numbers to said lines and columns, to reorganize said information data units by collecting lines to which the same numbers are assigned into reorganized data units, to form a plurality of data portions from the reorganized data units and control data units having check information for corresponding information data units, and to distribute the plurality of data portions to at least one data transmission unit;

a plurality of send boxes in the at least one data transmission unit to constantly transmit the plurality of data portions to at least one router; and the at least one router to cause the information content to be constantly available to the plurality of clients at a plurality of channels, to receive a content request at one of the plurality of channels, to send a random one of the plurality of data portions to the one of the plurality of clients, the random portion comprising data indicating whether the random portion is part of the requested content, and to send the rest of the requested content to the one of the plurality of clients via the one of the plurality of channels if the random portion is part of the requested content.

12. A machine readable medium having stored thereon executable code which causes a machine to perform a method of data transmission on demand to a plurality of clients without acknowledgment, the method comprising:

dividing information content stored on a server into information data units, each of said information data units comprising a rectangular matrix of lines and columns;

assigning numbers to said lines and columns;

reorganizing said information data units by collecting lines to which the same numbers are assigned into reorganized data units;

forming a plurality of data portions from the reorganized data units and control data units having check information for corresponding information data units;

constantly transmitting the plurality of data portions to at least one router on a server side for constant availability of the information content to the plurality of clients;

upon receiving a content request at one of a plurality of channels at the at least one router from one of the plurality of clients, sending a random one of from the plurality of data portions to the one of the plurality of clients, the random portion comprising data indicating whether the random portion is part of the requested content; and if the random portion is part of the requested content, sending the rest of the requested content to the one of the plurality of clients via the one of the plurality of channels.

* * * * *